Oct. 29, 1940.  D. D. DEAN  2,219,412
TRANSFER CELL FOR AUTOMOBILES
Filed June 21, 1939  3 Sheets-Sheet 3
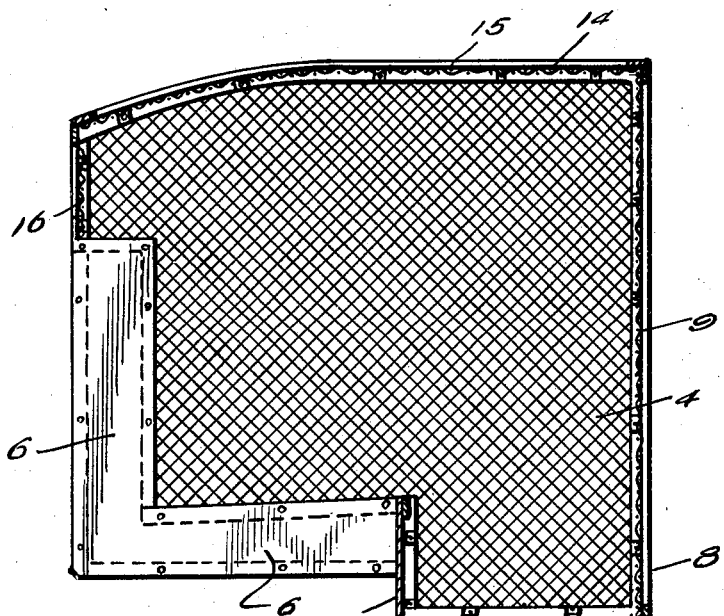
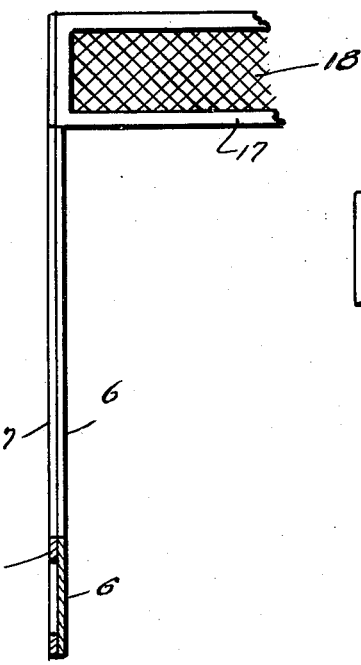
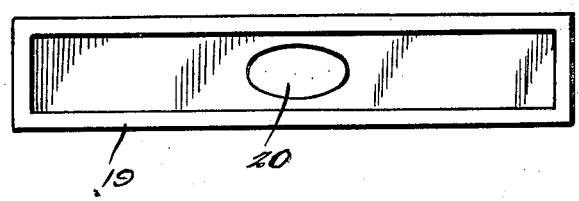
Inventor
D. D. Dean
By Clarence A. O'Brien
and Hyman Berman
Attorneys Patented Oct. 29, 1940

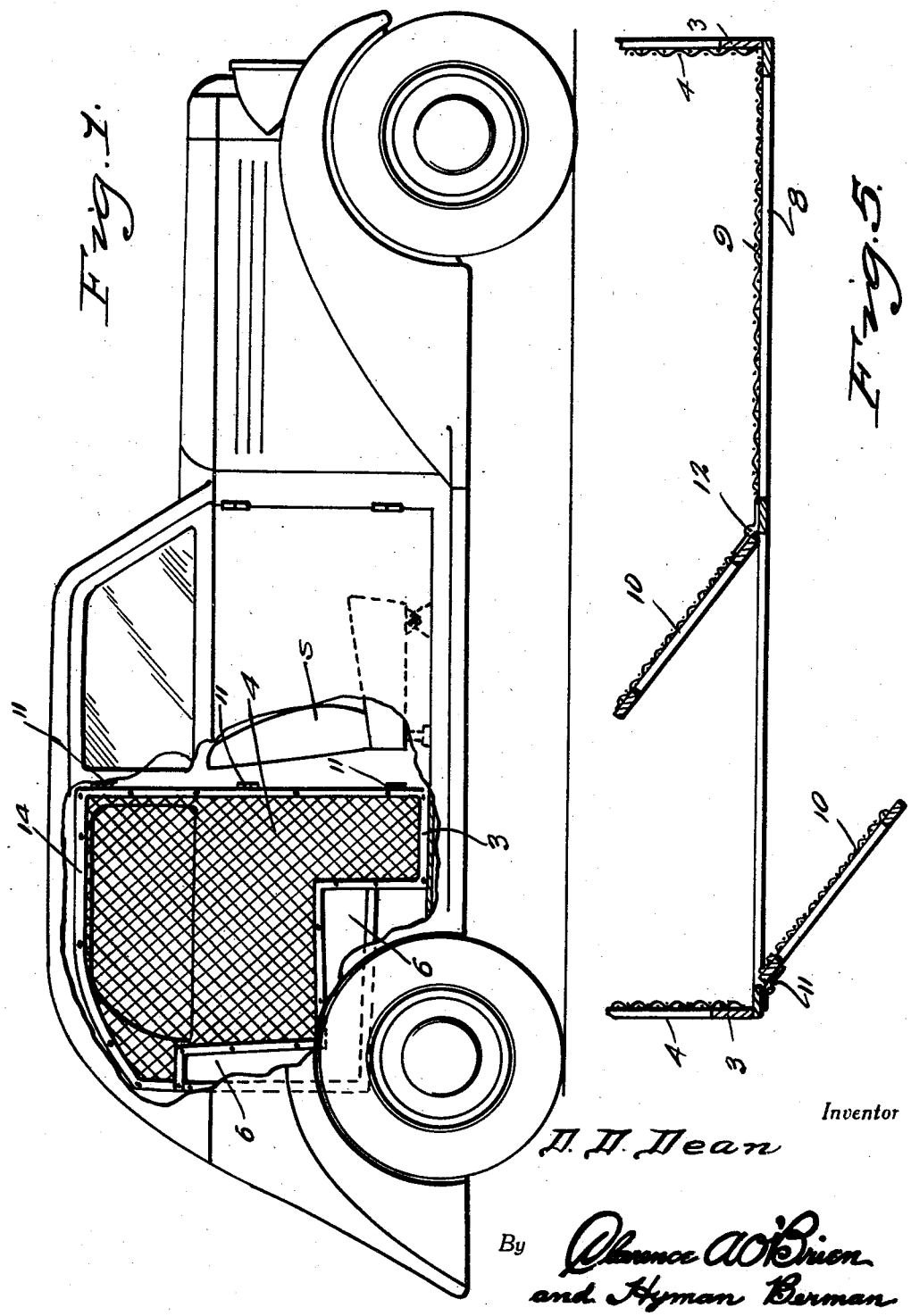

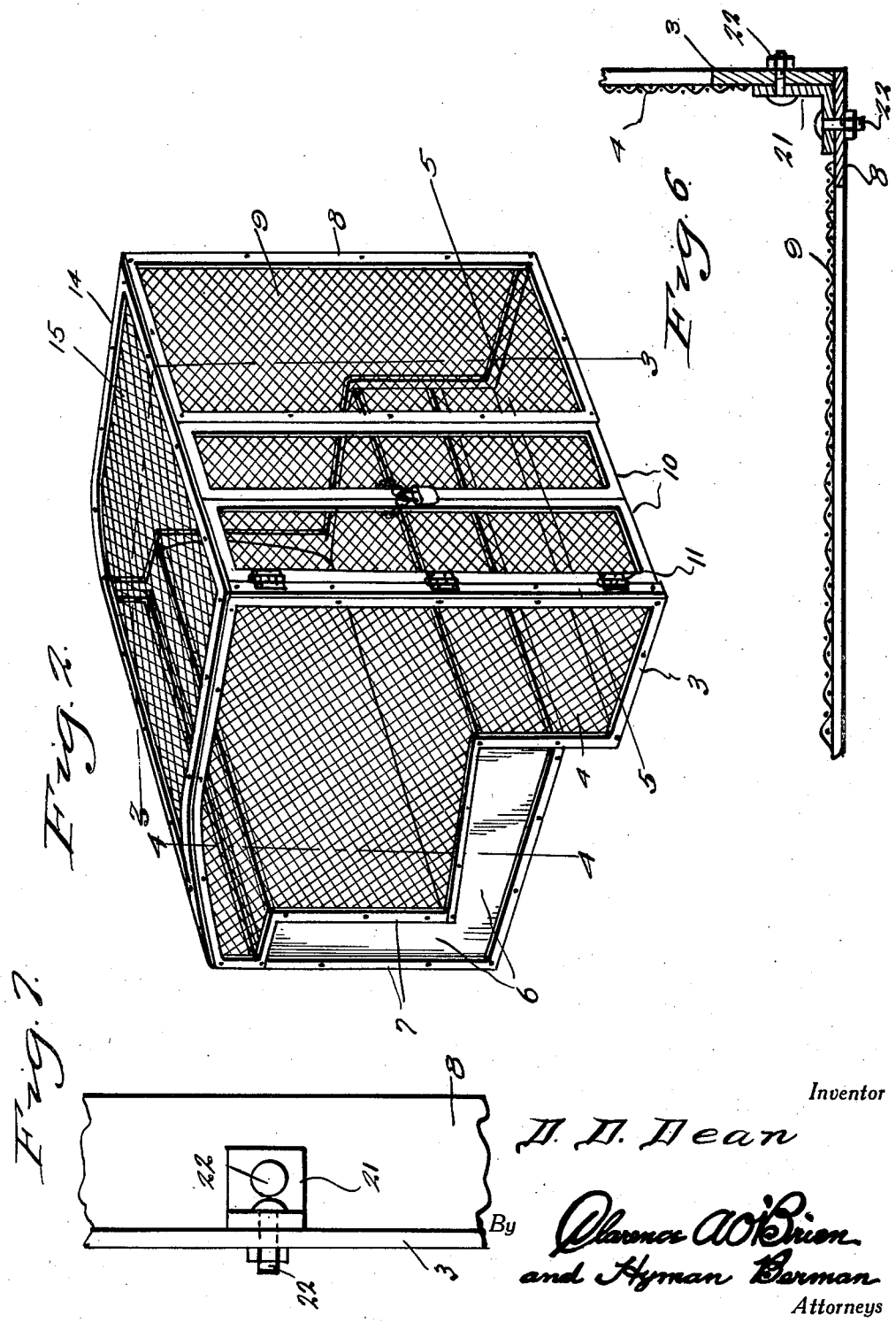

2,219,412

UNITED STATES PATENT OFFICE 2,219,412

TRANSFER CELL FOR AUTOMOBILES

Dick D. Dean, Mountain Park, Okla., assignor of one-fourth to Lilian Capps, Mountain Park, Okla.

Application June 21, 1939, Serial No. 280,378

1 Claim. (Cl. 189—5)

This invention relates to a transfer cell for automobiles, the general object of the invention being to provide means whereby a cell can be constructed in the rear part of an automobile for the transfer of prisoners from one point to another without danger of the prisoners escaping.

Another object of the invention is to so construct and arrange the parts that the cell can be constructed in the rear part of the automobile and then after being used can be taken apart so that the automobile can be used for ordinary purposes.

This invention also consists in certain other features of construction and in the combination and arrangement of the several parts to be hereinafter fully described, illustrated in the accompanying drawings and specificallly pointed out in the appended claim.

In describing the invention in detail, reference will be had to the accompanying drawings wherein like characters denote like or corresponding parts throughout the several views, and in which:

Figure 1 is an elevation of an automobile with parts broken away to show the invention therein.

Figure 2 is a perspective view of the cell.

Figure 3 is a section on the line 3—3 of Figure 2.

Figure 4 is a section on the line 4—4 of Figure 2.

Figure 5 is a section on the line 5—5 of Figure 2.

Figure 6 is a detail view taken through a corner part of the cell.

Figure 7 is a view showing how two frame members are connected together by angle clips.

Figure 8 is a view showing a modified panel arrangement for the rear part of the automobile.

In these drawings the numeral 1 indicates a metal plate which is placed on the floor of the motor vehicle between the front and rear seats and a second metal plate 2 covers the front portion of the rear seat, these plates being suitably bolted to bottom portions of the automobile. The cage or cell is formed of a pair of side frames or members each of which includes the metal strips 3 having attached thereto metal mesh 4 with portions of each side member composed of the horizontal and vertical metal plates 6 connected with the frame strips 7, these plates 6 extending between the ends of seat portions and the upholstering of the sides of the automobile at the rear thereof. The front of the cell or cage is composed of the metal strips 8 having connected therewith the metal mesh 9 and a portion of the front is left open and said opening is closed by the two doors 10 one of which is provided with the hinge means 11 to open outwardly while the other is formed with the hinge means 12 to open inwardly as shown in Figure 5, a suitable form of lock 13 being provided for locking the doors in closed position. The top of the cell is also composed of the metal strips 14 to which is connected the wire mesh 15 and the rear of the cage or cell above the back of the rear seat may be composed of a panel 16 formed of metal strips 17 and metal mesh 18 or it may be composed of a panel 19 such as shown in Figure 8 formed entirely of metal and having an opening 20 therein exposing the rear window of the automobile so that light can enter through said window into the cage or cell.

The several parts of the cell or cage can be connected together in various ways such as forming parts of angle irons and bolt the flanges of the irons together or the parts can be connected together by the angle iron clips 21 shown in Figures 6 and 7 which fit in the corners of the parts and to which the same parts are connected by the bolts 22, the nuts of which are located outside of the cell so that the prisoners cannot remove the bolts.

Thus the cage or cell can be assembled at the rear of an automobile and when it is desired to transport a prisoner or prisoners from one place to another the right hand portion of the front seat of the automobile is tilted forwardly and the right hand door of the cage opens outwardly and the other door inwardly so that the prisoner or prisoners can pass into the cage. Then the doors are closed and locked and thus the prisoners are safely confined in the cage in the rear of the automobile and it will be impossible for them to escape or to attack the persons sitting in the front seat.

While the drawings show the invention in use with the coach type of automobile it is to be understood that it can be used with the sedan type and in this case the cell door can be connected to a rear door of the automobile so as to move with the automobile door or a separate lock can be used for the cell door and the same moved independently of the automobile door.

Having described the invention what is claimed as new is:

A cell for use in the rear of an automobile body comprising a pair of side frames constructed and arranged to fit between the top and floor of said body and between the back of the front seat and the back of the body, said side frames having stepped lower edges adapting the same to fit over the rear seat, a pair of right-angled side panels within the confines of said frames, respectively, adapted to fit between ends of the rear seat cushion and the sides of the body, a front frame including a pair of doors hinged thereto, a top frame constructed and arranged to fit between the side frames and between the front frame and the back of the body, means to detachably secure said frames together, wire mesh panels closing said frames, respectively, a pair of right angularly related metallic plates fitting between said side frames, and detachably secured thereto, said plates forming a floor between the lower front corners of said side frames and an intermediate vertical partition between said frames adapted to extend upwardly from said floor and fit against the front of the rear seat and cushion, the back of the cell and the bottom thereof in the rear of said partition being open whereby the seat and back cushion of the rear seat may be utilized by a person confined in said cell.

DICK D. DEAN.